United States Patent [19]
Askienazy et al.

[11] 3,914,411
[45] Oct. 21, 1975

[54] BACTERICIDAL SOLUTIONS CONTAINING IODINE AND A CONDENSATION PRODUCT OF PROPYLENE OXIDE AND A TRIALKANALAMINE

[75] Inventors: Alexandre Askienazy; Georges Melki, both of Paris, France

[73] Assignee: Compagnie Francaise de Produits Industriels, Asnieres, France

[22] Filed: Feb. 29, 1972

[21] Appl. No.: 230,474

[30] Foreign Application Priority Data
Mar. 3, 1971  France .................. 71.07364

[52] U.S. Cl. ............... 424/150; 424/315; 424/325
[51] Int. Cl.² ........................................ A01N 11/00
[58] Field of Search .......... 424/150, 315, 342, 339, 424/325; 260/584; 252/106

[56] References Cited
UNITED STATES PATENTS

| | | | |
|---|---|---|---|
| 3,028,299 | 4/1962 | Winicov et al. .................. 424/150 |
| 3,277,010 | 10/1966 | Schenck et al. ............... 424/150 X |
| 3,355,386 | 11/1967 | Cantor et al. .................. 424/150 X |
| 3,380,923 | 4/1968 | Beach ........................... 424/150 X |
| 3,438,907 | 4/1969 | Schmolka ..................... 424/150 X |
| 3,513,098 | 5/1970 | Cantor et al. .................. 424/150 X |
| 3,534,102 | 10/1970 | Waldstein ..................... 424/150 X |
| 3,654,165 | 4/1972 | Bryant et al. .................. 424/150 X |
| 3,687,855 | 8/1972 | Halpern ........................ 424/150 X |

OTHER PUBLICATIONS
Schwatz & Perry—Surface Active Agent Vol. 1, 1949 pages 116–121 & 126.

Primary Examiner—Albert T. Meyers
Assistant Examiner—Leonard Schenkman
Attorney, Agent, or Firm—Lfiet & Jacobson

[57] ABSTRACT

The bactericidal substance comprises a support for iodine formed from a condensate of propylene oxide with an aliphatic polyol soluble in water, of the formula: Polyol —$(C_3H_6O)_n$, in which the "polyol" comprises three to six alcohol functions, especially glycerin, sorbitol, erythritol, penta- and dipenta-erythritol, trialkanolamines, especially triisopropanolamine, and in which $3 \leq n \leq 30$. This support provides gradual release of the iodine.

7 Claims, No Drawings

BACTERICIDAL SOLUTIONS CONTAINING IODINE AND A CONDENSATION PRODUCT OF PROPYLENE OXIDE AND A TRIALKANALAMINE

The invention relates to a bactericidal substance of the type which acts by the gradual liberation of iodine fixed to a "support" by coordinate bonds without the iodine liberated being potentially dangerous to the user.

Due to these substances, full advantage can be taken of the bactericidal activity of the iodine, which was not previously possible by reason of the low solubility of iodine in water, its high vapor pressure giving rise to the emission of irritant and objectionable vapors, its highly corrosive action relative to industrial plants and its irritating effect on the skin.

The substances are used for rendering industrial installations aseptic, especially in the food industry.

Substances of this type have already been proposed in which the support is constituted by surface active agents, especially condensates of ethylene oxide with alcohols, fatty acids, alkyl phenols and other substances, which constitute hydrophobic bases.

These substances can include up to 20 % by weight of iodine of which about two thirds are fixed by coordinate bonds, that is to say are "available" or also capable of gradual liberation as desired, the remainder being either combined chemically to the support and, consequently, lost for the desired activity, or in the free state, and then having the drawbacks of iodine applied as such, this portion being besides capable of being shown by extraction, for example by means of hexane or of heptane.

It is a particular object of the invention, to provide substances of the type concerned which respond to the various desiderata of practice better than hitherto.

The bactericidal substance according to the invention is characterized by the fact that it comprises as a support for iodine, a condensate of propylene oxide on an aliphatic polyol soluble in water whose formula is written:

Polyol —$(C_3H_6O)_n$ in which "polyol" denotes a polyol comprising three to six alcohol functions, in particular glycerin, sorbitol, erythritol, penta- and dipenta-erythritol, trialkanolamines, especially triisopropanolamine, and in which $3 \leq n \leq 30$.

The invention consists, apart from the abovesaid feature, of certain other features which are preferably used at the same time and which will be more explicitly considered below.

It will, in any case, be well understood by means of the complementary description which follows, as well as of the accompanying examples, given of course purely by way of illustrative but non-limiting indication.

According to the invention, and, more especially according to those of its types of application, as well as according to those embodiments of its various parts, to which it would appear that preference should be given, in order to form a bactericidal substance of the type concerned, procedure is as follows or in similar manner.

The bactericidal substance is constituted by causing iodine to react, in its solid state, on a support or substrate of the formula:

Polyol—$(C_3H_6O)_n$

In this formula, the term "polyol" denotes an aliphatic polyol soluble in water and comprising three to six alcohol functions. In addition, the value $n$ is selected from 3 to 30. Such substrates can be made by well-known methods and are widely available in commerce, for example under the name "Aminotriol" marketed by the French company Progil. This substrate is applied in liquid form, the whole being kept at a temperature of the order of 40° to 60°C for a sufficiently long time, generally of the order of 2 to 5 hours, for the medium to become homogeneous, which indicates that the reaction of fixation of the iodine is completed.

In the abovesaid formula, the polyol is selected generally from among glycerin, sorbitol, erythritol, penta- and dipenta-erythritol and trialkanolamines, especially triisopropanolamine; it is the latter which is often preferred.

This fixing of the iodine on the substrate is easy and economical by reason of the fact that the necessary temperature and time of heating are respectively hardly raised and relatively short.

The supports characteristic of the bactericidal substance according to the invention enable the obtaining, whilst remaining fluid, of a proportion of iodine in the bactericidal substance which can reach 40%, of which four-fifths are fixed in complex form, that is to say available for the desired application. The iodine thus fixed in the form of a complex can be titrated by means of thiosulfate. The percentage of free iodine capable of being extracted by hexane or heptane is very small and does not give a reaction with a moist starch paper held above the product.

The bactericidal substances according to the invention are hence much superior to those already known as regards the percentage of fixed iodine, which is manifested by distinct economy in transport and widens the possibilities of production of commercial products.

These substances are applied in a form of aqueous solutions.

Now, it is well known that increasing the proportion of propylene oxide in the support is concomitant with a reduction in the solubility of the support. On the other hand, a substance with a high proportion of propylene oxide gives a raised content of available iodine more easily.

In practice, supports with a high porportion of propylene oxide are used —especially supports in which 6 to 30 moles of propylene oxide are fixed on a base constituted in particular by triisopropanolamine — and the final bactericidal substance is solubilised by means of a hydrotropic substance.

The hydrotropic substances usable within the scope of the invention can be selected, for example, from among:

— the alkyl-arene-sulfonic acids, especially alkyl benzene-sulfonic acids in which the alkyl radical has, preferably, from one to sixteen carbon atoms, — the condensates of ethylene oxide, especially nonylphenol with 9 moles of ethylene oxide, — any other anionic, non-ionic, cationic or amphoteric surface active substances.

The mixtures constituted by the bactericidal substance and the hydrotropic product are soluble in all proportions in ordinary city water and give clear solutions.

As regards the abovesaid alkyl-arene-sulfonic acids, they are preferably used as their salts by reason of the pH, of the order of 2 to 3, which they confer on the final solutions and at which the maximum bactericidal activity is obtained.

When the alkyl radical of the alkyl-arene-sulfonic acid has one to six carbon atoms (the case, for example, of di-isopropyl-benzene-sulfonic acid), the aquous solution obtained is not foaming and, when the alkyl radical of the alkyl-arene-sulfonic acid has seven to 16 carbon atoms (the case, for example, of dodecyl-benzene-sulfonic acid), the acid concerned possesses surface active properties in addition to its hydrotropic nature towards the bactericidal substance according to the invention.

Generally, the ratio "hydrotropic product/bactericidal substance" is, at the most, of the order of 10/1.

Given that, from the legal point of view, the solutions applied for operations of disinfection and the like must not contain more than 1% of available iodine, that is to say gradually liberated, and taking into account, on one hand the fact that about four-fifths of the concentration of iodine in the bactericidal substance are available for the desired application, and on the other hand the fact that it is necessary to provide the presence of the hydrotropic product, the solutions placed at the disposition of the user contain generally from 60 to 90% of water.

Below, there are given several examples enabling the invention to be better understood.

EXAMPLE 1

*a*. Preparation of the bactericidal substance

The substrate is constituted by a condensate of 6 moles of the propylene oxide with one mole of triisopropanolamine.

The substrate is a liquid soluble in water.

Into a reaction vessel, there are introduced 70 parts by weight of this substrate and the temperature is brought to 45°-50°C. There are then introduced 30 parts by weight of iodine and it is stirred keeping the temperature at the above-said value until a homogeneous product is obtained, which requires about 2 hours.

The bactericidal substance thus obtained is in a form of a thick liquid product perfectly flowable, very slightly soluble in water.

This bactericidal substance contains about 80% of its iodine in available state (titratable by thiosulfate) and about 0.25% of its iodine in a free state, extractible with hexane, the rest of the iodine introduced being chemically combined. The test with moist starch paper held above the product is negative, the paper not being tinted.

The ratio "available iodine titrated with thiosulfate/iodine extractible with hexane" is, in the case of this example,:

$$\frac{80}{0.25} = 320.$$

*b*. Preparation of commercial bactericidal solution

Such a solution is prepared by means of the bactericidal substance obtained in paragraph (*a*), by dissolving 4 parts of this bactericidal substance and 86 parts of water containing in solution 10 parts of diisopropyl-benzene-sulfonic acid, which gives a coloured product, dark brown, limpid, stable to cold and whose available iodine content is practically invariable with time. This solution can be dissolved in any proportion in ordinary city water according to the uses contemplated, for example aseptisation of brewery, dairy and other industrial installations, especially for foodstuffs.

EXAMPLE 2

*a*. Preparation of the bactericidal substance

The support is constituted by a condensate of 20 moles propylene oxide with one mole of triisopropanolamine.

The support is a liquid very slightly soluble in water (about 0.01%).

Inside a reaction vessel containing 60 parts by weight of the abovesaid support and whose temperature has been brought to 45°–50°C, there are introduced 40 parts by weight of iodine. The reaction medium is subjected to stirring whilst keeping the temperature of 45°–50°C, until the obtaining of a homogeneous product, which requires about 4 hours.

The bactericidal substance obtained is insoluble in water and occurs in the form of a thick liquid product perfectly flowable.

Titration with thiosulfate shows that in the bactericidal substance obtained, 85 % of the iodine engaged is fixed by coordinate bonds.

Extraction with hexane shows that 0.23 % of the iodine engaged remains in the free state, the rest being consequently chemically combined.

The ratio "iodine available titrated with thiosulfate/iodine extractible with hexane" is, in the case of this example:

$$\frac{85}{0.23} = 369$$

If this result is compared with that obtained within the scope of example No. 1, it is seen that it is distinctly higher, which is due to the propylene oxide content of the support, higher in the case of this second example.

*b*. Preparation of a commerical bactericidal solution 2.5 parts of the bactericidal substance obtained according to paragraph (*a*) are dissolved in 87.5 parts of water containing in solution 10 parts of diisopropyl-benzene-sulfonic acid. There is obtained a coloured solution, limpid, stable to cold and capable of being diluted in any proportion with ordinary city water.

This commercial bactericidal solution is wetting but never foaming, and it is sufficiently acid to enable its use in certain descaling operations, for example in storage vats for mineral waters.

EXAMPLE 3

By means of the bactericidal substance obtained in example No. 2, a biodegradable anionic detergent and bactericide is prepared by dissolving 2.5 parts by weight of said bactericidal substance in 77.5 parts by weight of water in which 20 parts by weight of dodecyl-benzene-sulfonic acid have previously been dissolved. There is thus obtained a bactericidal solution, wetting, foaming and detergent.

EXAMPLE 4

A detergent, bactericidal and non-ionogenic solution is prepared by dissolving 2.5 parts by weight of the bactericidal substance obtained in example No. 2 in 87.5 parts by weight of water which contain in solution ten parts by weight of a condensate of nonylphenol including 8 to 9 moles of ethylene oxide.

The substrate or support itself can be made in manner known per se as follows.

Into an autoclave the polyol which must be oxypropylenated (for example triisopropanolamine, glycerin, sorbitol..) is charged after having dried it. A catalyst with an alkaline reaction is then introduced, then the apparatus is purged of air with a current of nitrogen. It is heated under a nitrogen atmosphere to about 110°–120°C, then propylene oxide in known amount is added little by little, The temperature is kept at the aforesaid level, the reaction being exothermic. At the end of the reaction the support formed is removed.

As a result of which and whatever the embodiment adopted, there is thus provided a bactericidal substance whose characteristics emerge sufficiently from the foregoing for it to be unnecessary to dwell further on this subject and which has, with respect to those previously existing, numerous advantages, including — that of including a very high percentage of available iodine, hence economy in manufacture, transportation, and increase in possibilities of formulation of commercial products, — that of being more economic to manufacture, since the times of manufacture are short and the temperatures little raised, — that of having an available iodine content (titratable with thiosulfate) stable with time.

As is self-evident and as emerges already from the foregoing, the invention is in no way limited to those of its types of application, nor to those embodiments of its various parts, which have been more especially indicated; it encompasses, on the contrary, all modifications.

We claim:

1. A bactericidal solution, comprising:
   A. iodine and a condensation product of 3 to 30 moles of propylene oxide with one mole of triisopropanolamine, said condensation product having about 40% of iodine fixed thereto, at least about 80% of the fixed iodine being titratable with thiosulfate;
   B. a hydrotropic agent in an amount sufficient to solubilize said condensation product and fixed iodine selected from the group consisting of anionic, nonionic, cationic and amphoteric surface active agents; and
   C. water in an amount of 60 to 90% of said bactericidal solution.

2. A bactericidal solution according to claim 1, wherein the hydrotropic agent is an alkyl-arenesulfonic acid in which the alkyl radical contains from one to six carbon atoms.

3. A bactericidal solution according to claim 2, wherein the hydrotropic agent is diisopropyl-benzenesulfonic acid.

4. A bactericidal solution according to claim 1, wherein the hydrotropic agent is an alkyl-arenesulfonic acid in which the alkyl radical contains from seven to 16 carbon atoms.

5. A bactericidal solution according to claim 4, wherein the hydrotropic agent is dodecyl-benzenesulfonic acid.

6. A bactericidal solution according to claim 1, wherein the hydrotropic agent is a condensation product of ethylene oxide.

7. A bactericidal solution according to claim 6, wherein the hydrotropic agent is the condensation product of one mole nonyl-phenol and 9 or 10 moles of ethylene oxide.

* * * * *